(12) United States Patent
You et al.

(10) Patent No.: US 8,040,447 B2
(45) Date of Patent: Oct. 18, 2011

(54) METHOD OF DRIVING DISPLAY DEVICE COMPRISING ELECTRICALLY CONNECTING A CONTROL CAPACITOR TO THE SECOND PIXEL ELECTRODE AND CHANGING THE VOLTAGE OF THE FIRST PIXEL ELECTRODE BY CHANGING A VOLTAGE OF A FIRST STORAGE LINE

(75) Inventors: Hye-ran You, Yongin-si (KR); Yoon-sung Um, Yongin-si (KR); Jin-won Park, Suwon-si (KR); Hoon Kim, Ansan-si (KR)

(73) Assignee: Samsung Electronics Co., Ltd. (KR)

( * ) Notice: Subject to any disclaimer, the term of this patent is extended or adjusted under 35 U.S.C. 154(b) by 170 days.

(21) Appl. No.: 12/128,951

(22) Filed: May 29, 2008

(65) Prior Publication Data
US 2009/0027578 A1    Jan. 29, 2009

(30) Foreign Application Priority Data

Jul. 26, 2007    (KR) .......................... 10-2007-0075299

(51) Int. Cl.
*G02F 1/1343*    (2006.01)
*G02F 1/136*    (2006.01)
*G02F 1/137*    (2006.01)

(52) U.S. Cl. ................................ 349/39; 349/48; 349/33
(58) Field of Classification Search .................... 349/39, 349/48, 33
See application file for complete search history.

(56) References Cited

U.S. PATENT DOCUMENTS

| | | | |
|---|---|---|---|
| 2002/0018035 A1 * | 2/2002 | Song et al. ....................... | 345/87 |
| 2005/0036091 A1 * | 2/2005 | Song .............................. | 349/129 |
| 2006/0215066 A1 * | 9/2006 | Ueda et al. ....................... | 349/38 |
| 2006/0268186 A1 | 11/2006 | Kamada et al. | |
| 2006/0286703 A1 | 12/2006 | Um et al. | |

* cited by examiner

*Primary Examiner* — Mark Robinson
*Assistant Examiner* — Dennis Y Kim
(74) *Attorney, Agent, or Firm* — Innovation Counsel LLP

(57) ABSTRACT

A display device includes a pixel comprising first and second pixel electrodes receiving respective pixel voltages; a control capacitor electrically connected to the second pixel electrode by a switching operation in order to change the voltage of the second pixel electrode; and a first storage line overlapping the first pixel electrode and having a variable voltage in order to change the voltage of the first pixel electrode. A method of driving a display device includes providing a pixel voltage to each of first and second pixel electrodes of a pixel; and then changing the voltages applied to the first pixel electrode and/or the second pixel electrode to cause the first and second pixel electrodes to simultaneously be at different voltages.

16 Claims, 8 Drawing Sheets

METHOD OF DRIVING DISPLAY DEVICE COMPRISING ELECTRICALLY CONNECTING A CONTROL CAPACITOR TO THE SECOND PIXEL ELECTRODE AND CHANGING THE VOLTAGE OF THE FIRST PIXEL ELECTRODE BY CHANGING A VOLTAGE OF A FIRST STORAGE LINE

This application claims priority from South Korean Patent Application No. 10-2007-0075299 filed on Jul. 26, 2007 in the Korean Intellectual Property Office, the disclosure of which is incorporated herein by reference in its entirety.

BACKGROUND OF THE INVENTION

1. Field of the Invention

The present invention relates to a display device and a method of driving the same, and more particularly, to a display device including a plurality of pixel electrodes, each partitioned into a main pixel electrode and a subpixel electrode in order to represent different grayscales.

2. Description of the Related Art

A liquid crystal display (LCD) includes a LCD panel which includes a thin-film transistor (TFT) substrate ("lower substrate" below) having a plurality of thin-film transistors formed thereon and an upper substrate which may include a color filter substrate having a color filter layer formed thereon. An LCD panel also includes a liquid crystal layer interposed between the thin-film transistor substrate and the upper substrate. Since the LCD panel is non-self-luminous, a backlight unit may be provided on a rear surface of the LCD panel to emit light.

Generally, LCD panels have a narrower viewing angle (defined as the maximum angle with a contrast ratio of 1:10) than self-luminous display panels. One class of LCD panels is vertical alignment (VA) mode LCD panels. A VA mode LCD panel includes electrodes on the TFT substrate and on the upper substrate. In order to improve the viewing angle in VA mode LCD panels, variations of these panels have been developed, including patterned VA mode LCD panels (having openings formed in electrodes on the upper and lower substrates), multi-domain VA mode LCD panels (having protrusions formed on electrodes on the upper and lower substrates), and mixed VA mode LCD panels (having openings in electrodes on the lower substrate and protrusions on electrodes on the upper substrate).

However, in these LCD panel variations, an image color may depend on the angle at which the image is viewed by an observer. Such color dependency is due to the fact that the red, green and blue primary colors displayed by the pixels may change in different proportions with the viewing angle of the observer. Therefore, the color obtained as a mixture of the red, green and blue primary colors changes according to the viewing angle of the observer.

In order to solve this problem, a new mode of LCD panel has been developed. In the new mode LCD panel, each pixel electrode is partitioned into a main pixel electrode and a subpixel electrode so that the pixel electrode can simultaneously represent different luminance levels. The new mode LCD panel may include different switching devices connected to the main pixel electrode and the subpxiel electrode, so that different pixel voltages can be simultaneously applied to the main pixel electrode and the subpixel electrode. Alternatively, the new mode LCD panel may have an additional capacitor between a switching device and the subpixel electrode while no capacitor is provided between the switching device and the main pixel electrode. It is desirable to find ways to more effectively apply different pixel voltages to the main pixel electrode and the subpixel electrode in new mode LCD panels.

SUMMARY

Some embodiments of the present invention provide a display device which can efficiently apply different pixel voltages to a main pixel electrode and a subpixel electrode.

Some embodiments of the present invention also provide a driving method in which different pixel voltages can be efficiently applied to a main pixel electrode and a subpixel electrode.

However, the present invention is not restricted to the features described above.

In some embodiments of the present invention, a display device comprises: a pixel electrode of a pixel, the pixel electrode comprising first and second pixel electrodes for receiving voltages; a control switching device electrically connected to the second pixel electrode; a control electrode electrically connected to the control switching device; a first storage line overlapping the first pixel electrode to form a first storage capacitor; and a second storage line overlapping the control electrode and the second pixel electrode to form a control capacitor and a second storage capacitor, respectively.

In some embodiments, the control electrode overlaps the first pixel electrode to form an additional control capacitor.

In some embodiments, at least one of the first pixel and second pixel electrodes comprises one or more openings.

Some embodiments further comprise a common electrode facing the first and second pixel electrodes, wherein the common electrode comprises one or more openings and/or one or more protrusions.

Some embodiments of the present invention provide a method of driving a display device, the method comprising: providing a pixel voltage on each of first and second pixel electrodes of a pixel; after the pixel voltage has been provided to the first and second pixel electrodes, performing operations of: (1) electrically connecting a control capacitor to the second pixel electrode; and (2) changing the voltage of the first pixel electrode by changing a voltage of a first storage line which overlaps the first pixel electrode.

In some embodiments, operation (1) reduces a voltage difference between the pixel voltage of the second pixel electrode and a common voltage. In some embodiments, operation (2) increases a voltage difference between the pixel voltage of the first pixel electrode and the common voltage.

Some embodiments of the present invention provide a method of driving a display device comprising a pixel electrode comprising a first pixel electrode and a second pixel electrode, the method comprising: (1) electrically connecting a control capacitor to the second pixel electrode and providing a control voltage to the first and second pixel electrodes and to a control electrode of the control capacitor; (2) applying a pixel voltage to each of the first and second pixel electrodes; (3) electrically connecting the control capacitor to the second pixel electrode to control the voltage of the second pixel electrode by the control voltage by; and (4) changing the voltage of the first pixel electrode by changing a voltage of a first storage line which overlaps the first pixel electrode.

Some embodiments of the present invention provide a display device comprising: a pixel comprising first and second pixel electrodes receiving respective pixel voltages; a control capacitor electrically connected to the second pixel electrode by a switching operation in order to change the voltage of the second pixel electrode; and a first storage line overlapping the first pixel electrode and having a variable voltage in order to change the voltage of the first pixel electrode.

Some embodiments of the present invention provide a method of driving a display device, the method comprising: providing a pixel voltage to each of first and second pixel electrodes of a pixel; and then changing the voltages applied to the first pixel electrode and/or the second pixel electrode to cause the first and second pixel electrodes to simultaneously be at different voltages.

Other features are described below. The invention is defined by the appended claims, which are incorporated into this section by reference.

DETAILED DESCRIPTION OF THE INVENTION

Figure 1:
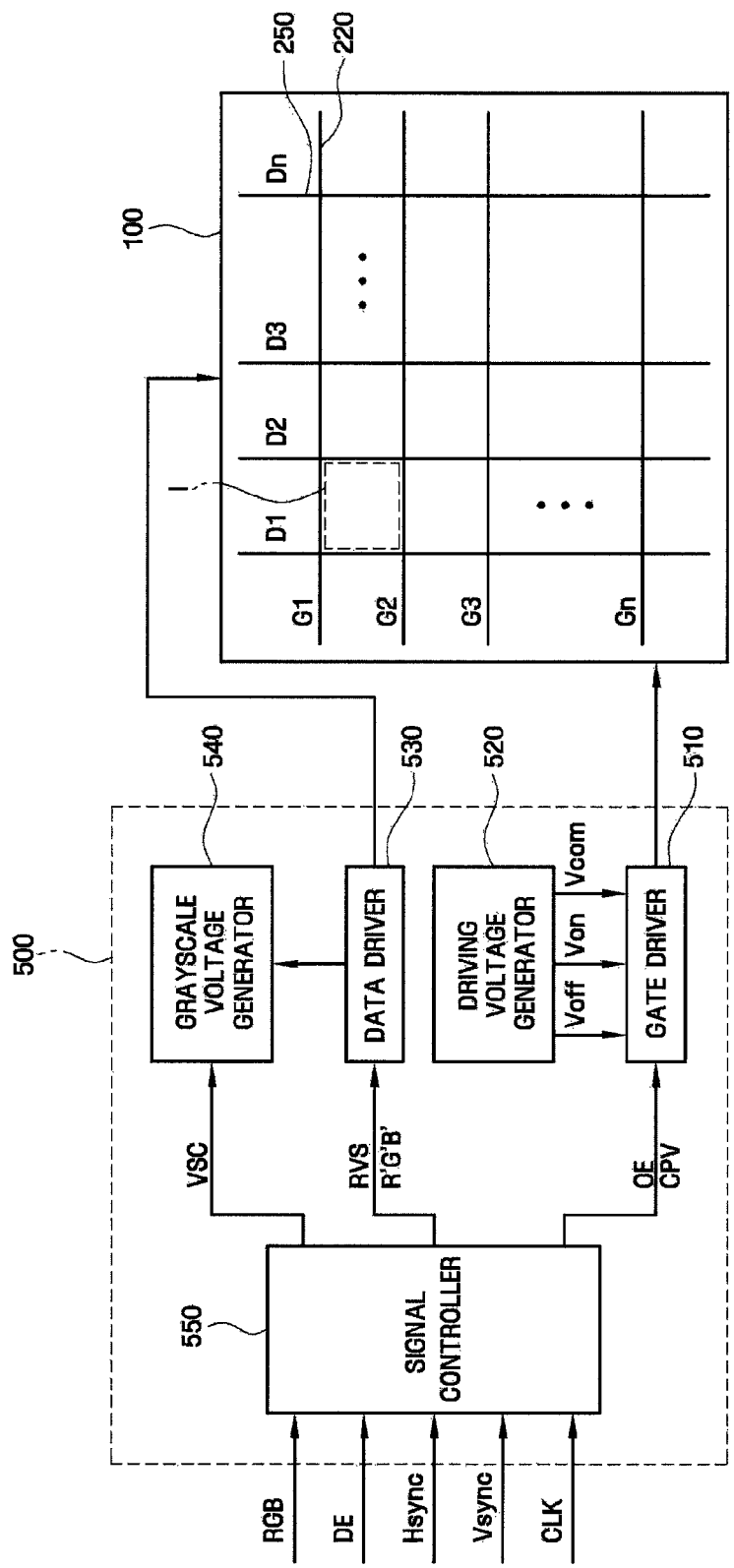
FIG. 1 is a block diagram of a display device according to exemplary embodiments of the present invention.

Some embodiments of the present invention will now be described with reference to the attached drawings. Like reference numerals in the drawings denote like elements, and repetitive descriptions of like elements in different embodiments will be avoided Elements may be improved as needed in order to improve the display device and/or the method of driving the same, and such improvements may be within the scope of the present invention as defined by the appended claims. In addition, embodiments or elements of a conventional display device may be combined with embodiments or elements used in embodiments of the present invention to obtain other embodiments of the present invention.

FIG. 1 is a block diagram of a display device according to an exemplary embodiment of the present invention. The display device of FIG. 1 includes a display panel 100 and a panel driver 500. The display panel 100 includes a plurality of pixels I arranged in a matrix. The display panel 100 is a liquid crystal panel and includes a first substrate, a second substrate and a liquid crystal layer interposed between the first and second substrates. The panel driver 500 includes a gate driver 510, a driving voltage generator 520, a data driver 530, a grayscale voltage generator 540, and a signal controller 550 driving the gate driver 510, the driving voltage generator 520, the data driver 530 and the grayscale voltage generator 540.

The driving voltage generator 520 generates a gate-on voltage Von, which turns on first and second thin-film transistors T1 and T2 (FIG. 2) and a control thin-film transistor TC, and also generates a gate-off voltage Voff, which turns off the first and second thin-film transistors T1 and T2 and the control thin-film transistor TC. The driving voltage generator 520 also generates a common voltage Vcom which is applied to a common electrode.

The grayscale voltage generator 540 generates a plurality of grayscale voltages which define luminance levels for the display device.

The gate driver 510 is connected to a plurality of gate lines and provides gate signals to the gate lines. Each gate signal alternates between the gate-on voltage Von and the gate-off voltage Voff which are provided by the driving voltage generator 520.

The data driver 530 receives the grayscale voltages from the grayscale voltage generator 540 and applies to data lines those of the grayscale voltages that were selected by the signal controller 550.

An external graphics controller (not shown) provides to the signal controller 550 red (R), green (G) and blue (B) signals and input control signals for controlling the R, G and B signals. The input control signals may include, for example, a vertical synchronizing signal Vsync, a horizontal synchronizing signal Hsync, a main clock CLK and a data enable signal DE. The signal controller 550 generates gate control signals, data control signals and a voltage selection control signal VSC based on the input control signals. The gate control signals include a vertical synchronization start signal STV for indicating the output start of a gate-on pulse (a high voltage level of a gate signal), a gate clock signal for controlling the output time of the gate-on pulse, and a gate-on enable signal OE for limiting the width of the gate-on pulse. The data control signals include a horizontal synchronization start signal STH for indicating the input start of a grayscale signal, a load signal LOAD or TP for indicating the application of a corresponding data voltage (i.e. grayscale voltage) to a data line, a reverse driving signal RVS for reversing the polarity of a data voltage, and a data clock signal HCLK.

Each pixel I is a minimum independent unit displaying a color, which can be red, blue or green. A pixel I can be defined, for example, as a region surrounded by data lines and gate lines, but this definition is not limiting. A pixel I may be defined as a region surrounded by data lines and storage lines or by data lines, gate lines and storage lines.

Figure 2:
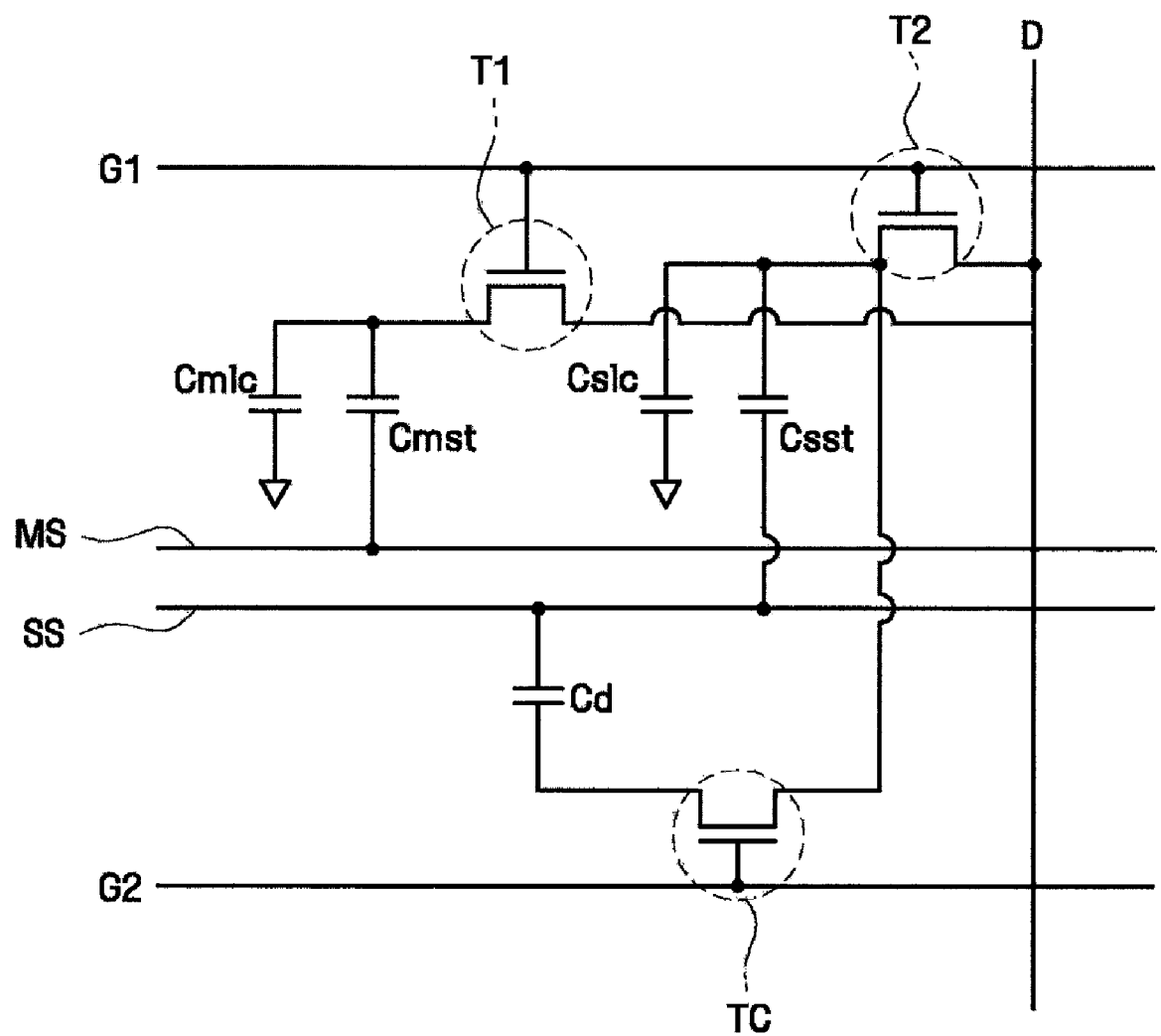
FIG. 2 is a circuit diagram of one pixel of the display device of FIG. 1 according to an exemplary embodiment of the present invention.

FIG. 2 is an equivalent circuit diagram of one representative pixel I according to an exemplary embodiment of the present invention. The remaining pixels are identical, and are arranged in a matrix.

The pixel I of FIG. 2 is associated with a first gate line G1 and a second gate line G2 which extend parallel to each other, and with a data line D which crosses over the first and second gate lines G1 and G2. The pixel I includes three thin-film transistors, i.e., the first and second thin-film transistors T1 and T2 and the control thin-film transistor TC. The gate electrodes of the first and second thin-film transistors T1 and T2 are connected to the first gate line G1, and the gate electrode of the control thin-film transistor TC is connected to the second gate line G2. The second gate line G2 may be connected to the gate electrodes of first and second thin-film transistors (not shown) of an adjacent pixel. In other embodiments, instead of being connected to the second gate line G2, the gate electrode of the control thin-film transistor TC is connected to a separate line which is not a gate line.

The input terminal of each of the first and second thin-film transistors T1 and T2 is connected to the data line D. The input terminal of the control thin-film transistor TC is connected to an output terminal of the second thin-film transistor T2. The output terminals of the first and second thin-film transistors T1 and T2 are connected to respective independent pixel electrodes of the pixel I in order to apply specific voltages to the respective regions of the liquid crystal layer. More particularly, the output terminal of the first thin-film transistor T1 is connected to a main pixel electrode 271 (see FIG. 4) which forms one electrode of a main liquid-crystal capacitor Cmlc. The output terminal of the second thin-film transistor T2 is connected to a subpixel electrode 272 (see FIG. 4) which forms one electrode of a subpixel liquid-crystal capacitor Cslc. The other electrode of each of the main liquid-crystal capacitor Cmlc and the subpixel liquid crystal capacitor Cslc is provided by the common electrode 350 (see FIG. 3) located opposite to the main pixel electrode 271 and the subpixel electrode 272 and receiving the common voltage (Vcom).

The output terminals of the first and second thin-film transistors T1 and T2 are also connected respectively to a first storage capacitor Cmst and a second storage capacitor Csst.

The input terminal of the control thin-film transistor TC is connected to the output terminal of the second thin-film transistor T2, and the output terminal of the control thin-film transistor TC is connected to a control electrode 255a (see FIG. 4) which forms one electrode of a control capacitor Cd.

A second storage line SS provides an electrode to each of the second storage capacitor Csst and the control capacitor Cd. The second storage line SS receives a fixed voltage, possibly the common voltage.

When the control thin-film transistor TC is turned on, the voltage across the subpixel liquid-crystal capacitor Cslc (which is equal to the difference between the voltage of the subpixel electrode 272 and the common voltage or some other voltage on the second storage line SS) is changed by the control capacitor Cd which is connected in series to each of the subpixel liquid-crystal capacitor Cslc and the second storage capacitor Csst. Before the control thin-film transistor TC is turned on, the control electrode 255a of the control capacitor Cd has a voltage of the opposite polarity relative to a current pixel voltage Vp applied to the subpixel electrode 272. Therefore, after the control thin-film transistor TC is turned on, the difference between the voltage of the subpixel electrode 272 and the common voltage is reduced from the initial value Vp to a new value Vp'. Denoting the electrostatic capacity (i.e. the capacitance) of each capacitor by the same symbol as the capacitor itself, i.e. denoting the electrostatic capacity of the subpixel liquid-crystal capacitor Cslc as Cslc, the electrostatic capacity of the second storage capacitor Csst as Csst, and the initial voltage of the control electrode 255a as Vcc, we obtain:

$$Vp'=Vp-(Vp-Vcc)Cd/(Cslc+Csst+Cd) \quad (1)$$

Thus, the initial voltage Vp−Vcom across the subpixel liquid-crystal capacitor Cslc can be considerably greater than the new voltage Vp'−Vcom, so the LCD response time can be reduced.

At the same time, the first storage capacitor Cmst uses a first storage line MS as an electrode, and the voltage of the first storage line MS varies. After the pixel voltage Vp has been applied to the main pixel electrode 271, the first thin-film transistor T1 turns off, and the voltage of the first storage line MS changes. Accordingly, the voltage of the main pixel electrode 271 changes to some new value Vp' (not to be confused with the value Vp' discussed above in connection with the subpixel electrode 272). Denoting the electrostatic capacity of the first storage capacitor Cmst as Cmst, the electrostatic capacity of the main liquid-crystal capacitor Cmlc as Cmlc, and a voltage change of the first storage line MS is $V_{shift}$, Vp'=Vp+$V_{shift}$ Cmst/(Cmst+Cmlc).

The voltage of the first storage line MS changes as follows. If the initial pixel voltage Vp is greater than the common voltage, then the voltage of the first storage line MS is increased (i.e. $V_{shift}$>0). Consequently, the new pixel voltage Vp' of the main pixel electrode 271 is greater than the initial pixel voltage Vp. On the other hand, if the initial pixel voltage Vp is smaller than the common voltage, then the voltage of the first storage line MS is decreased ($V_{shift}$<0). Consequently, the new pixel voltage Vp' of the main pixel electrode 271 is smaller than the initial pixel voltage Vp.

The electrostatic capacity of the main liquid-crystal capacitor Cmlc depends on the tilt of the liquid crystal molecules. In the case of nematic liquid crystal having negative dielectric anisotropy, when the liquid crystal molecules are vertically aligned, the electrostatic capacity of the main liquid-crystal capacitor Cmlc is small. On the other hand, when the liquid crystal molecules are aligned horizontally, the electrostatic capacity of the main liquid-crystal capacitor Cmlc is large. Therefore, if the alignment of the liquid crystal molecules changes from vertical to horizontal (as in the case of increasing luminance in a vertical alignment mode), the electrostatic capacity of the main liquid-crystal capacitor Cmlc is gradually increased. Accordingly, the difference between the new pixel voltage Vp' and the common voltage is gradually reduced.

The initial voltage difference Vp−Vcom across the capacitor Cmlc is considerably greater than the final value of the new voltage Vp'−Vcom, so the response time can be reduced.

The voltage ratio of the subpixel electrode 272 to the main pixel electrode 271 defines the light transmission ratio of the subpixel electrode to the main pixel electrode. This transmission ratio may have a fixed value or may depend on the grayscale image signal. In the case when the image signal is low (indicating black) or high (indicating maximum luminance), the transmission ratio of the subpixel to the main pixel may be close to one. In the case of intermediate grayscale image signals, the transmission ratio of the subpixel electrode to the main pixel electrode may be adjusted to be in the range of 0.5 to 0.9.

Figure 3:
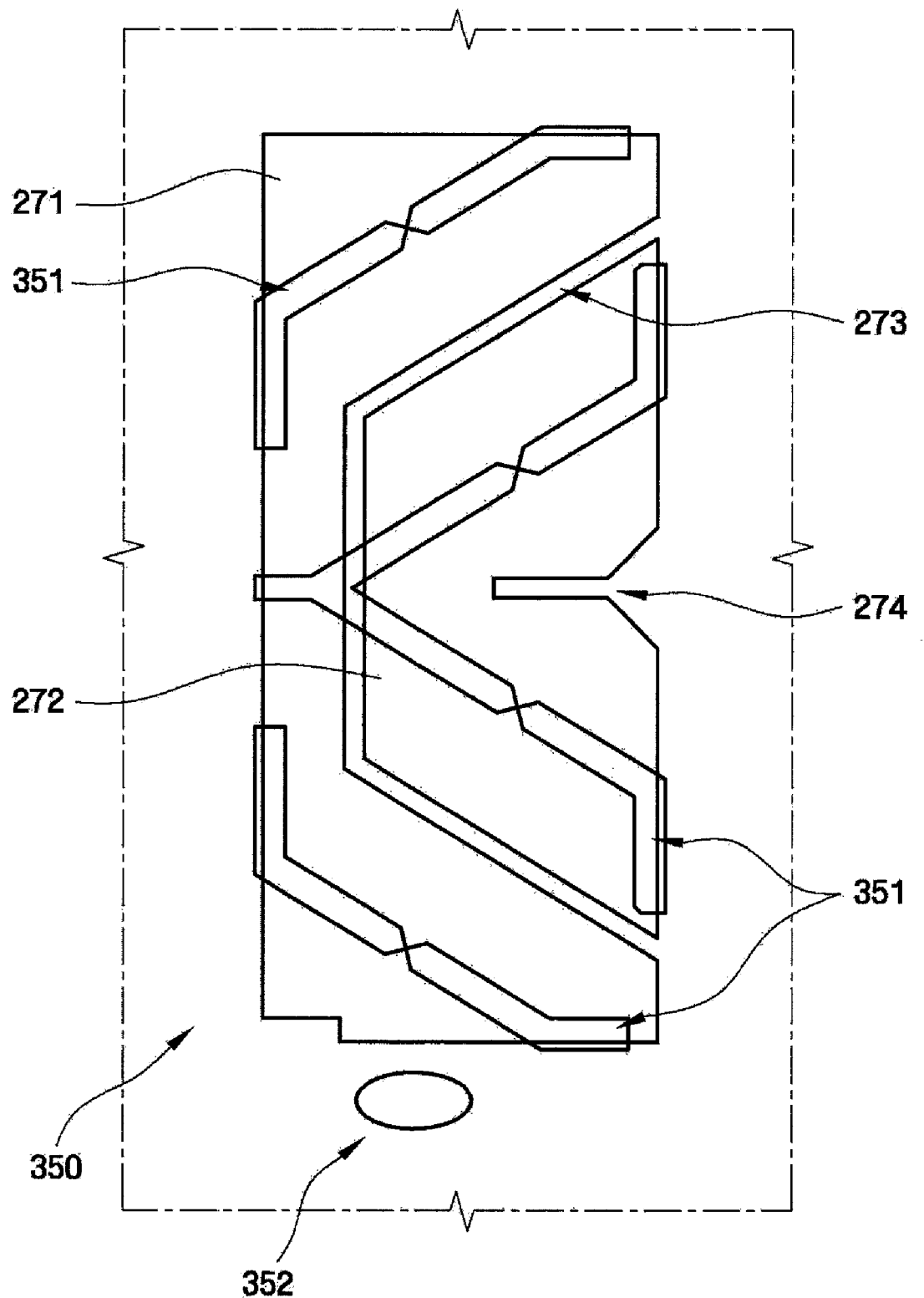
FIG. 3 is a plan view of a pixel electrode and a common electrode in the pixel of FIG. 2.

FIG. 3 is a plan view of a pixel electrode and the common electrode 350 for the pixel I shown in FIG. 2.

Referring to FIG. 3, the main pixel electrode 271 and the subpixel electrode 272 of the lower substrate face the common electrode 350 of the upper substrate. The main pixel electrode 271 and the subpixel electrode 272 are separated from each other by an opening 273 provided to define various domains. Additional openings 274 may be present in the main pixel electrode 271 and/or the subpixel electrode 272. The common electrode 350 of the upper substrate may have opening or protrusions 351 ("domain control elements" below) used to define domains.

Different segments of the openings 273 and 274 and of the domain control elements 351 may be disposed in an alternating fashion and parallel to each other within the pixel I.

Each of the domain control elements 351 of the upper substrate may include a stem parallel to the openings 273 or 274 of the lower substrate, and may also include a branch which extends along a boundary between the main pixel electrode 271 and the subpixel electrode 272 of the lower substrate. The stem of each of the domain control elements 351 may include a notch which is recessed or protrudes from the rest of the stem.

A black matrix 320 (FIG. 5) covers a region which overlaps the boundary between adjacent pixel electrodes. The black matrix 320 can be formed on the upper or lower substrate.

Inside the region of the black matrix 320, a spacer 352 may be formed in order to maintain a desired spacing between the upper and lower substrates. Specifically, the spacer 352 may be formed near an end of a branch of a domain control element 351.

Figure 4:
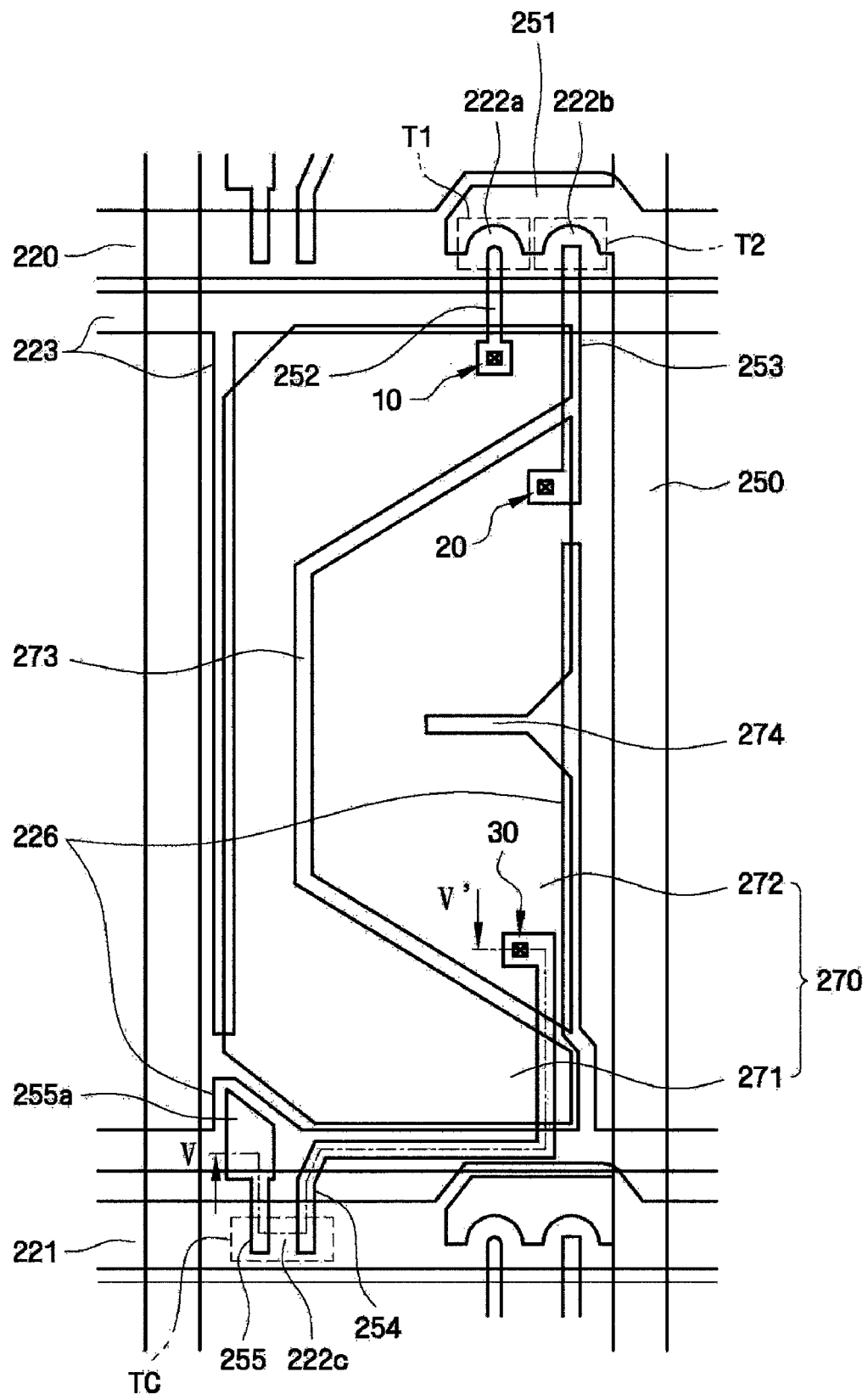
FIG. 4 is a plan view of a substrate including a pixel electrode in a display device of FIG. 2.
Figure 5:
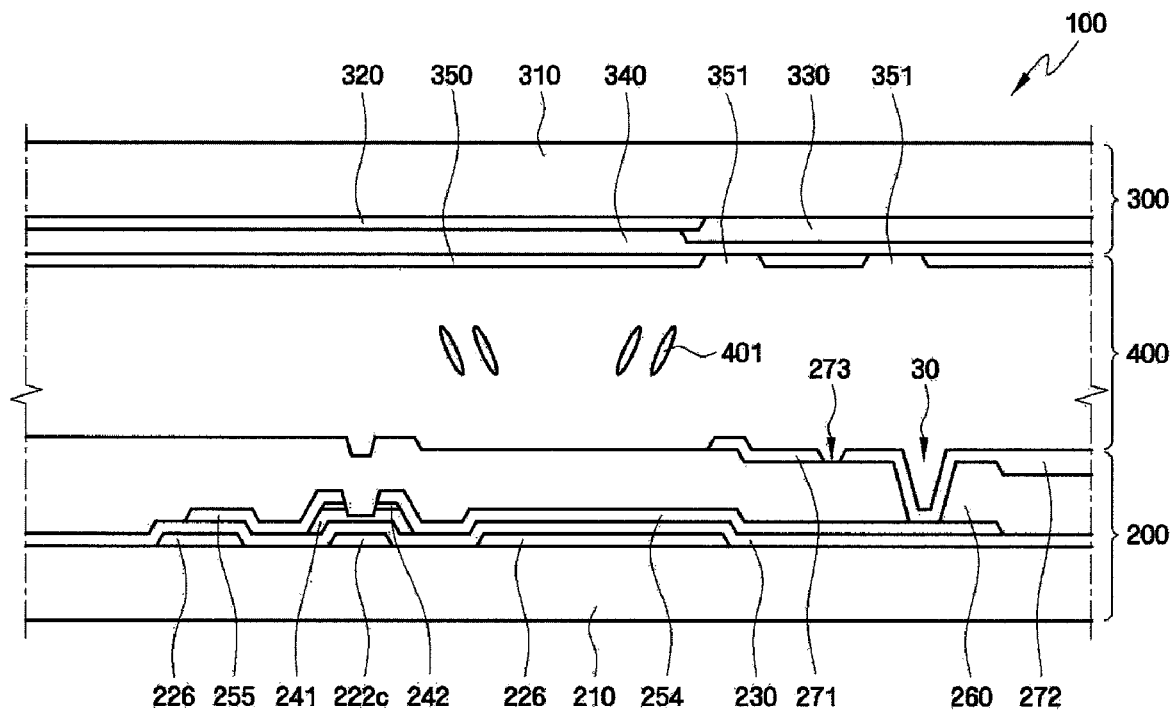
FIG. 5 shows a vertical cross-section along a line V-V' of FIG. 4.

FIG. 4 is a plan view of the lower substrate's portion including a single pixel I shown in FIG. 2. FIG. 5 is a cross-sectional view taken along a line V-V' of FIG. 4.

Referring to FIGS. 4 and 5, each pixel I is a pixel region defined by a first gate line 220, a second gate line 221 and a data line 250. The pixel region is rectangular. As described above, the pixel I includes three thin-film transistors, i.e., the first and second thin-film transistors T1 and T2 and the control thin-film transistor TC. The first thin-film transistor T1 drives the main pixel electrode 271, the second thin-film transistor T2 drives the subpixel electrode 272, and the control thin-film transistor TC changes the voltage of the subpixel electrode 272.

The display device includes a first substrate 200 having the pixel electrode 270, a second substrate 300 facing the first substrate 200 and having the common electrode 350, and a liquid crystal layer 400 interposed between the first and second substrates 200 and 300.

The first substrate 200 includes gate wiring, a first storage line 223 (shown as MS in FIG. 2) and a second storage line 226 (SS in FIG. 2) that are all formed over a first insulation substrate 210. The gate wiring and the first and second storage lines 223 and 226 may each be a single metal layer or a multi-metal layer. The gate wiring includes the first and second gate lines 220 and 221 and first through third gate electrodes 222a through 222c connected to the first and second gate lines 220 and 221. The first and second storage lines 223 and 226 overlap the pixel electrode 270 or the control electrode 255a to form capacitors. The first through third gate electrodes 222a through 222c are part of the first thin-film transistor T1, the second thin-film transistor T2, and the control thin-film transistor TC, respectively. The first gate electrode 222a and the second gate electrode 222b may be formed as part of the first gate line 220 or as an extension or extensions of the first gate line 220. The third gate electrode 222c may be formed as part of the second gate line 221 or as an extension of the second gate line 221.

The first storage line 223 overlaps the main pixel electrode 271 and thus forms the first storage capacitor Cmst. The second storage line 226 overlaps the control electrode 255a to form the control capacitor Cd and overlaps the subpixel electrode 272 to form the second storage capacitor Csst.

Portions of the first storage line 223 and the second storage line 226 extend parallel to each other in the direction of the data line 250. The shapes and positions of the first and second storage lines 223 and 226 are not limited to those of FIGS. 4 and 5 and may be varied as needed.

On the first insulation substrate 210, a gate insulation film 230 made, for example, of silicon nitride (SiNx) covers the gate wiring and the first and second storage lines 223 and 226.

A semiconductor layer 241 of hydrogenated amorphous silicon is formed on the gate insulation film 230 over the first through third gate electrodes 222a through 222c.

An ohmic contact layer 242 is formed on the semiconductor layer 241. The ohmic contact layer 242 can be formed of a material such as silicide or n+ hydrogenated amorphous silicon heavily doped with n-type impurities. Referring to the control thin-film transistor TC of FIG. 5, a portion of the ohmic contact layer 242 between a source electrode 254 and a drain electrode 255 of transistor TC has been removed.

Data wiring is formed on the ohmic contact layer 242 and the gate insulation film 230. Each element of the data wiring may be a single metal layer or a multi-metal layer. The data wiring includes the data line 250, source electrodes 251 of transistors T1 and T2, source electrode 254 of transistor TC, and drain electrodes 252, 253, 255 of respective transistors T1, T2, TC. The source electrodes 251 are merged into a node which functions as the input terminal of each of the first and second thin-film transistors T1 and T2. This node will be called a common source electrode and denoted by the same numeral 251 as the individual source electrodes. The data line 250 extends in a vertical direction in the view of FIG. 4 and crosses over the first and second gate lines 220 and 221 to form the pixel I. The drain electrodes 252, 253 are separated from the respective source electrodes 251 and are formed on portions of the ohmic contact layer 242 opposite respective portions of the ohmic contact layer 242 which underlie the respective source electrodes 251. The drain electrode 255 is separated from the source electrode 254 and is formed on the portion of the ohmic contact layer 242 opposite that portion of the ohmic contact layer 242 which underlies the source electrode 254.

The common source electrode 251 branches off from the data line 250 and is disposed over the first and second gate electrodes 222a and 222b. The source electrode 254, which functions as the input terminal of the control thin-film transistor TC, is electrically connected to the subpixel electrode 272.

The drain electrode 252 of transistor T1 is connected to the main pixel electrode 271 through a first contact hole 10, and the drain electrode 253 of transistor T2 is connected to the subpixel electrode 272 through a second contact hole 20. The source electrode 254 of the control thin-film transistor TC is connected to the subpixel electrode 272 through a third contact hole 30. The drain electrode 255 of transistor TC is connected to the control electrode 255a. The control electrode 255a and the second storage line 226 overlap each other, thereby forming the control capacitor Cd.

A passivation layer 260 is formed over the data wirings and the semiconductor layer 241. The first through third contact holes 10 through 30 exposing respectively the drain electrodes 252 and 253 of transistors T1 and T2 and the source electrode 254 of transistor TC are formed in the passivation layer 260. The passivation layer 260 according to the present embodiment may be an organic layer, an inorganic layer, or a combination of organic and inorganic layers.

The pixel electrode 270 is formed on the passivation layer 260. The pixel electrode 270 can be made of a transparent conductive material such as indium tin oxide (ITO) or indium zinc oxide (IZO). The pixel electrode 270 includes the main pixel electrode 271 electrically connected to the drain electrode 252 of transistor T1 by the first contact hole 10, and also includes the subpixel electrode 272 electrically connected to the drain electrode 253 of transistor T2 by the second contact hole 20. The subpixel electrode 272 is connected to the source electrode 254 of the control thin-film transistor TC by the third contact hole 30.

The main pixel electrode 271 and the subpixel electrode 272 are separated from each other by the opening 273, and the additional opening 274 is formed in the subpixel electrode 272. An additional opening or openings may also be formed in the main pixel electrode 271. Openings formed in the subpixel electrode 272 and/or the main pixel electrode 271 are used to define a plurality of domains. The openings may be replaced by protrusions. These openings or protrusions are used as domain control elements.

Each of the openings 273 and 274 includes an oblique portion tilted at an angle of approximately 45 or 135 degrees with respect to the first and second gate lines 220 and 221. The openings 273 and 274 of the pixel electrode 270 are used as the domain control elements to partition the liquid crystal layer 400 into a plurality of domains, together with the openings or protrusions 351 (FIG. 3) of the common electrode 350. The multiple domains allow widening of the viewing angle.

The black matrix 320 is formed on a second insulation substrate 310 of the second substrate 300. The black matrix 320 separates the red, green and blue filters from each other and blocks direct light from the thin-film transistors disposed on the first substrate 200. The black matrix 320 is made of a photosensitive organic material with an addition of a black pigment, or of a material such as chrome (Cr) or chrome oxide (CrOx).

The red, green and blue filters separated by the black matrix 320 are repeated to form a color filter layer 330. The color filter layer 330 adds color to light emitted by the backlight unit (not shown) and transmitted through the liquid crystal layer 400. The color filter layer 330 is made of a photosensitive organic material.

An overcoat layer 340 is formed on the color filter layer 330 and the black matrix 320. The overcoat layer 340 protects the color filter layer 330 and provides a planar surface over the color filter layer 330. The overcoat layer 340 can be made of an acrylic epoxy material.

The common electrode 350 is formed on the overcoat layer 340. The common electrode 350 is made of a transparent conductive material such as ITO or IZO. The common electrode 350 applies a voltage to the liquid crystal layer 400, together with the pixel electrode 270 of the first substrate 200. Openings 351 are formed in the common electrode 350. The openings 351 of the common electrode 350 are parallel to oblique portions of the opening 273. That is, the openings 351 of the common electrode 350 are at an angle of approximately 45 or 135 degrees with respect to the first and second gate lines 220 and 221. The openings 351 of the common electrode 350 together with the openings 273 and 274 of the pixel electrode 270 partition the liquid crystal layer 400 into a plurality of domains.

The openings 273 and 274 of the pixel electrode 270 and the openings 351 of the common electrode 350 are not limited to the shapes of the present embodiment. Other shapes are possible.

The liquid crystal layer 400 includes a plurality of liquid crystal molecules 401 and is interposed between the first and second substrates 200 and 300. The liquid crystal molecules 401 are nematic liquid crystal molecules having negative dielectric anisotropy. The liquid crystal layer 400 has a vertical alignment (VA) mode. When no voltage is applied to the liquid crystal molecules 401, the liquid crystal molecules 401 are vertically aligned (in the view of FIG. 5). When a voltage is applied to the liquid crystal molecules 401, the liquid crystal molecules 401 are aligned perpendicular to the electric field since they have negative dielectric anisotropy.

Although not shown in the drawings, lower and upper polarizers may be provided on the outer surfaces of the first and second substrates 200 and 300, respectively. The optical transmission axes of the upper and lower polarizers are perpendicular to each other. In some embodiments, the optical transmission axes of the upper and lower polarizers match the gate line and data line directions.

A compensation film may be interposed between the lower polarizer and the first substrate 200 and between the upper polarizer and the second substrate 300.

Figure 6:
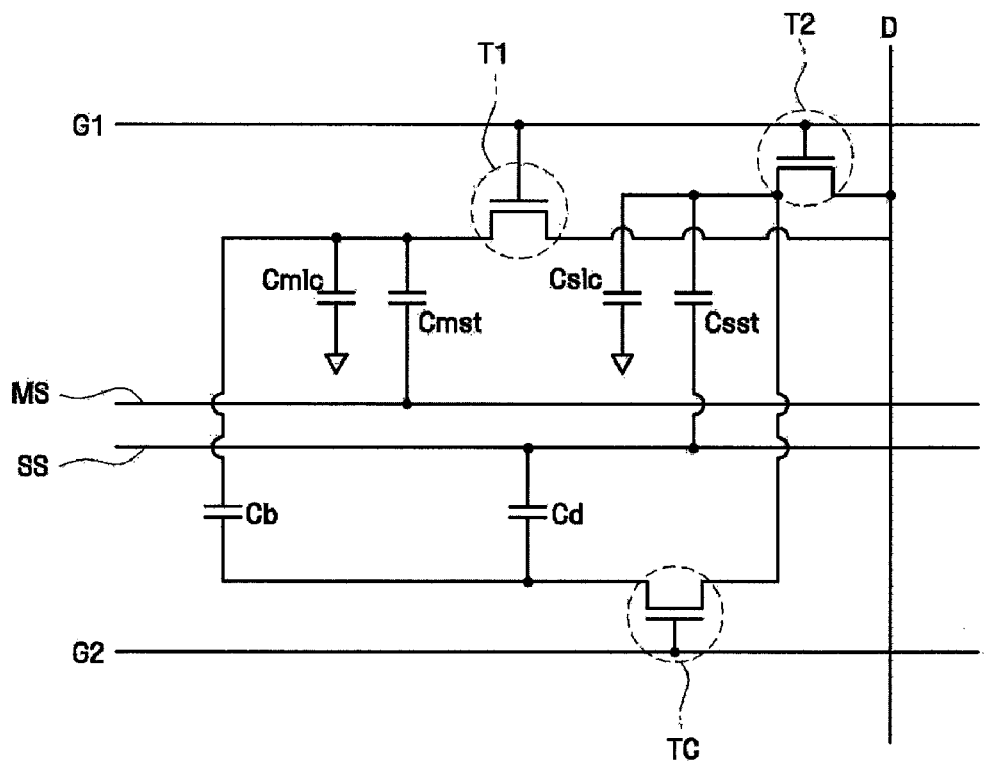
FIG. 6 is a circuit diagram of one pixel of the display device of FIG. 1 according to an exemplary embodiment of the present invention.

FIG. 6 is an equivalent circuit diagram of one of the pixels I included in the display device of FIG. 1 according to an exemplary embodiment of the present invention.

If the control electrode 255a of FIG. 4 extends further to overlap the main pixel electrode 271, the pixel of FIG. 6 can be obtained. Specifically, the control electrode 255a may overlap the main pixel electrode 271 to form an additional control capacitor Cb. The additional control capacitor Cb is connected in series between the main pixel electrode 271 and the control capacitor Cd. Therefore, when a pixel voltage is applied to the main pixel electrode 271, the voltage of the control electrode 255a is changed by some amount $\delta_1$. Later, when the subpixel electrode 272 is connected to the control electrode 255a, the voltage of the control electrode 255a changes further by some amount $\delta_2$ having the same sign (positive or negative) as $\delta_1$, which in turn may raise the voltage magnitude on the main pixel electrode 271.

Figure 7:
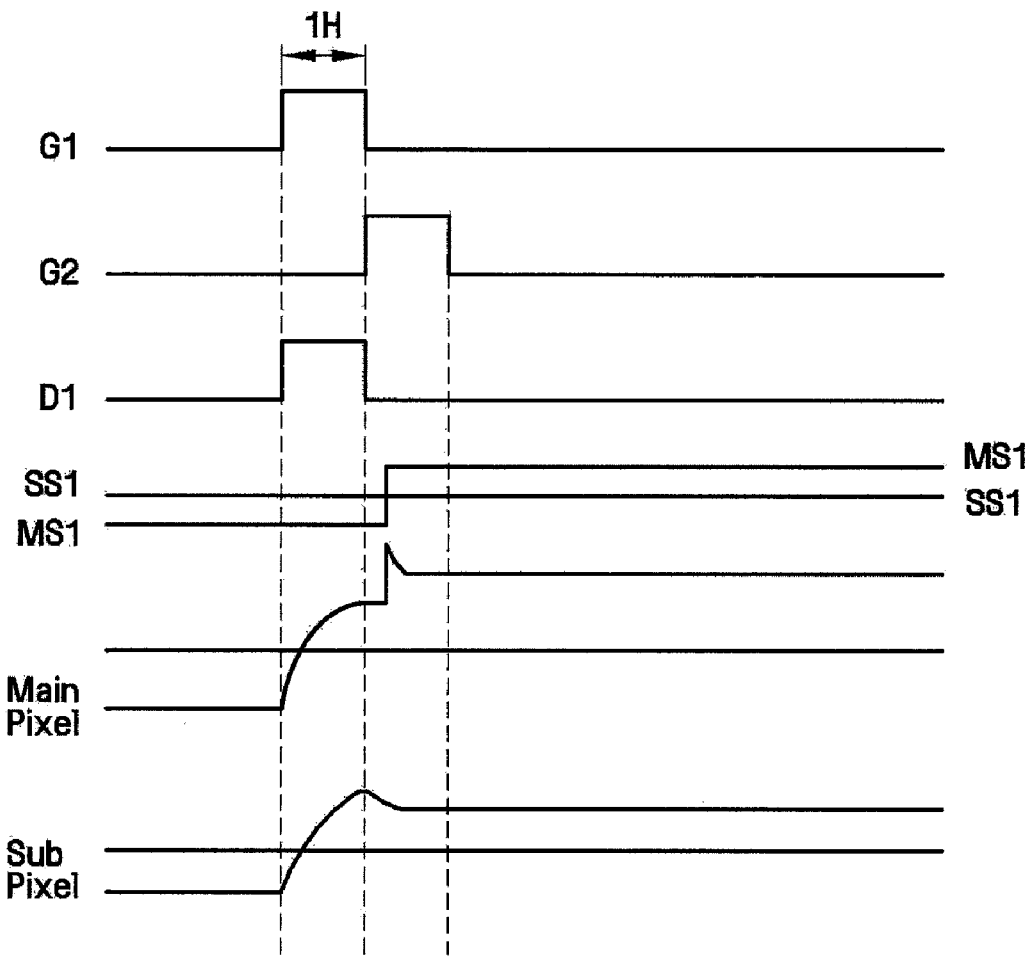
FIG. 7 is a signal waveform diagram according to an exemplary embodiment of the present invention.

FIG. 7 is a signal waveform obtained in driving the display device according to an exemplary embodiment of the present invention.

Referring to FIG. 7, the gate driver 510 provides gate signals to the gate lines. The voltage on the data line D of FIG. 2 or 6 is shown as D1 in FIG. 7. Each gate signal includes gate-on pulses whose width is shown as 1H. A gate-on pulse of width 1H is sequentially provided on the first through $n^{th}$ gate lines G1 through Gn. The data driver 530 provides data signals during the gate-on pulse and thus applies pixel voltages to the pixel electrodes 270. At this time, the same pixel voltage may be applied to the main pixel electrode 271 and the subpixel electrode 272 of a pixel I.

The first and second thin-film transistors T1 and T2 are turned on and then turned off in response to the gate-on pulse on the first gate line G1. Then a gate-on pulse is provided on the second gate line G2, and the voltage of the first storage line MS is changed (this voltage is shown as MS1 in FIG. 7, while the voltage on the second storage line SS is shown as SS1). While the gate-on pulse is provided on the second gate line G2, a pixel voltage is applied to the adjacent pixel electrode 270, and the control thin-film transistor TC of the "current" pixel (i.e. the pixel connected to the gate line G1) is turned on. As a result, the subpixel electrode 272 is connected to the control capacitor Cd in series, and thus the voltage of the subpixel electrode 272 is reduced. More particularly, the difference between the voltage of the subpixel liquid-crystal capacitor Cslc and the common voltage is reduced. Meanwhile, the voltage change on the first storage line MS increases the voltage of the main pixel electrode 271. More particularly, the difference between the voltage of the main liquid-crystal capacitor Cmlc and the common voltage is increased.

Prior to turning on of the control thin-film transistor TC, the control electrode 255a of the control capacitor Cd was at a voltage of the opposite polarity than the current pixel voltage.

The pixel voltage of each of the main pixel electrode 271 and the subpixel pixel electrode 272 varies with the voltages on the first and second gate lines G1 and G2 in a manner described above with reference to FIG. 2.

Figure 8:
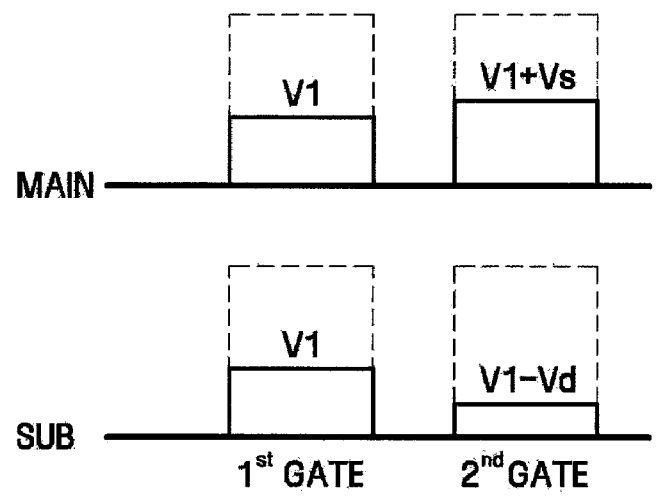
FIG. 8 illustrates voltages applied to a pixel electrode in an embodiment of FIG. 7.

FIG. 8 is a schematic diagram illustrating the voltage variations of the pixel electrode 270 in the operation of FIG. 7. In FIG. 8, "MAIN" refers to the voltage of the main pixel electrode 271. "SUB" refers to the voltage of the subpixel electrode 272. The voltages MAIN and SUB are shown at the end of the gate-on pulse on the first gate line G1 (this pulse is indicated by dotted lines over "$1^{st}$ GATE") and at the end of the gate-on pulse on the second gate line G2 (this pulse is shown by dotted lines over "$2^{nd}$ GATE").

Referring to FIG. 8, the same pixel voltage V1 is initially applied to the main pixel electrode 271 and the subpixel electrode 272. Later, when the control thin-film transistor TC is turned on, the control capacitor Cd is connected to the subpixel electrode 272, and then a voltage change $V_{shift}$ is provided on the first storage line 223 (also shown as MS). Consequently, the voltage of the main pixel electrode 271 becomes V1+Vs, and the voltage of the subpixel electrode 272 becomes V1−Vd.

The value of Vs is smaller than the voltage change value $V_{shift}$ of the first storage line 223 or MS. Denoting the electrostatic capacity of the main storage capacitor Cmst as Cmst and of the main liquid-crystal capacitor Cmlc as Cmlc, we can write that Vs=$V_{shift}$Cmst/(Cmst+Cmlc). Further, denoting the electrostatic capacity of the control capacitor Cd as Cd, the electrostatic capacity of the subpixel liquid-crystal capacitor Cslc as Cslc, the electrostatic capacity of the second storage capacitor Csst as Csst, and the voltage change of the control electrode 255a is Vcc, we can write that Vd=(V1−Vcc)Cd/(Cslc+Csst+Cd).

Figure 9:
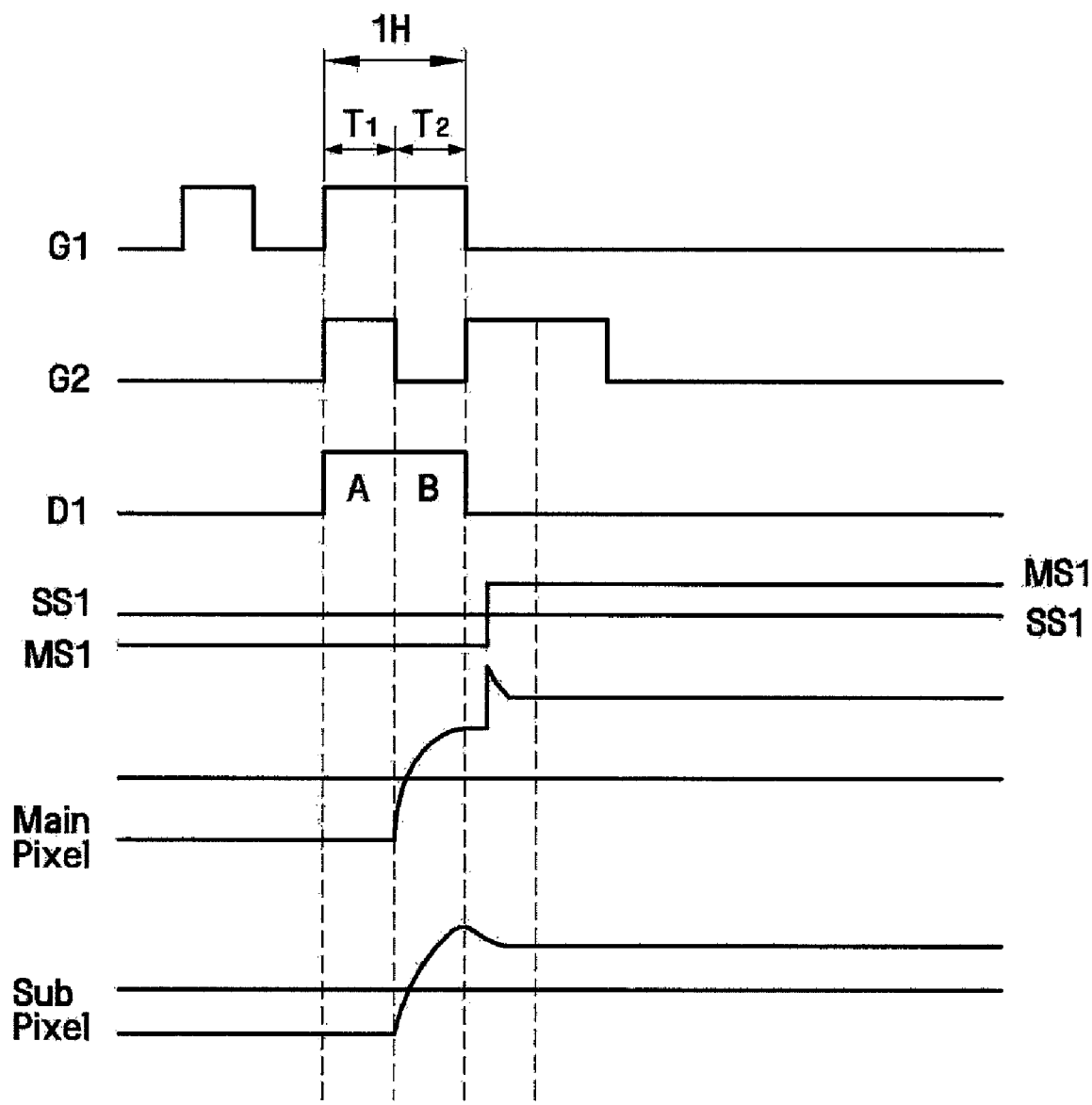
FIG. 9 is a signal waveform diagram according to another exemplary embodiment of the present invention.

FIG. 9 is a signal waveform diagram obtained in driving the display device according to another exemplary embodiment of the present invention.

Referring to FIG. 9, the gate driver 510 provides overlapping gate-on pulses to the first and second gate lines G1 and G2. The duration of the longest pulse is shown as 1H. The longest pulse consists of a first period of time $T_1$ and a second period of time $T_2$. The longest pulse ("pulse 1H" hereinbelow) is preceded by a shorter pulse of duration $T_1$. The shorter pulse is referred to as "pulse $T_1$" hereinbelow. The sequence of two pulses $T_1$, 1H is sequentially provided to the first through $n^{th}$ gate lines G1 through Gn. The pulse 1H on the first gate line G1 begins at the same time as the pulse $T_1$ on the second gate line G2. The second gate line G2 is deactivated during the remaining second period of time $T_2$ of the pulse 1H on the first gate line G1. Thus, during the pulse 1H on the first gate line G1, the second gate line G2 is activated at the same time as the first gate line G1 and then turned off and thus deactivated after the first period of time $T_1$.

During the pulse 1H on the first gate line G1, the data driver 530 applies a "control" voltage A to the data lien D as shown in the D1 diagram, and therefore the voltage A is provided to the main pixel electrode 271, the subpixel electrode 272, and the control electrode 255a of the control capacitor Cd connected to the subpixel electrode 272 during the first period of time $T_1$. During the second period of time $T_2$, the data driver 530 applies a data voltage B to the main pixel electrode 271 and the subpixel electrode 272. The control voltage A is used to control the voltage change of the subpixel electrode 272 and may have any of the levels available for the data voltage B. For example, the control voltage A may be equal to the common voltage or to the data voltage B. For example, if the pixel I is to provide an intermediate luminance, the control voltage A may be equal to the common voltage. If the pixel I is to provide the maximum or minimum luminance, the control voltage A may be equal to the data voltage B.

After the first and second thin-film transistors T1 and T2 have been turned on by the pulse 1H on the first gate line G1 and then turned off at the end of the pulse 1H, the pulse 1H is provided to the second gate line G2, and then the voltage of the first storage line MS or 223 is changed. During the pulse 1H on the second gate line G2, the control voltage A is applied to the adjacent pixel electrode 270, and the control thin-film transistor TC connected to the subpixel electrode 272 of the "current" pixel (the pixel connected to the first and second gate lines G1 and G2) is turned on. As a result, the subpixel electrode 272 is connected to the control capacitor Cd, and thus the voltage of the subpixel electrode 272 may decrease or remain unchanged depending on the control voltage A which was provided on the control electrode 255a during the time $T_1$ of the pulse 1H on the first gate line G1. More particularly, the voltage across the subpixel liquid-crystal capacitor Cslc (the difference between the voltage of the subpixel electrode 272 and the common voltage) is reduced (in magnitude) or remains unchanged. A change in the voltage of the first storage line MS or 223 increases the voltage of the main pixel electrode 271. More particularly, the difference between the voltage of the main liquid-crystal capacitor Cmlc and the common voltage is increased (in magnitude).

The ratio of the first period of time $T_1$ to the second period of time $T_2$ may vary according to the time required to charge the pixel electrode 270 to desired voltages.

The voltages of the main pixel electrode 271 and the subpixel pixel electrode 272 in FIG. 9 change in a manner similar to that of FIG. 7, as described above in connection with FIG. 2.

Figure 10:
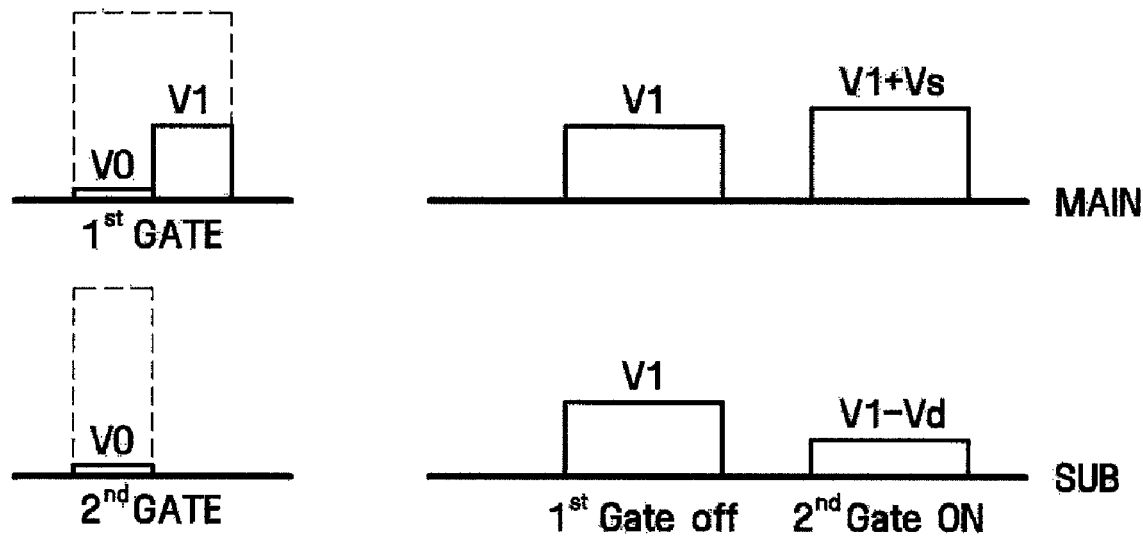
FIG. 10 illustrates voltages applied to a pixel electrode in an embodiment of FIG. 9 for a control voltage A of 0 V.

FIG. 10 is a schematic diagram illustrating some voltages when the driving method of FIG. 9 is used with the control voltage A=0 V. In FIG. 10, "$1^{st}$ GATE" refers to the first gate line G1, "$2^{nd}$ GATE" refers to the second gate line G2, "MAIN" refers to the main pixel electrode 271, and "SUB" refers to the subpixel electrode 272. The voltages V0 and V1 are the same as the respective voltages A and B in FIG. 9. The voltages MAIN and SUB are shown at the end of the pulse 1H on the first gate line G1 (this pulse is indicated by dotted lines over "$1^{st}$ GATE") and at the end of the period $T_1$ of the pulse 1H on the second gate line G2 (this period $T_1$ is indicated by dotted lines over "$2^{nd}$ GATE").

In the pulse 1H on the first gate line G1, the first and second thin-film transistors T1 and T2 and the control thin-film transistor TC are turned on during the first period of time $T_1$. Accordingly, the control voltage A of 0 V is applied to the main pixel electrode 271, the subpixel electrode 272 and the control electrode 255a connected to the subpixel electrode 272. During the period $T_2$, only the first and second thin-film transistors T1 and T2 are turned on, and thus a voltage V1 (i.e. B) is applied to the main pixel electrode 271 and the subpixel electrode 272. Next, in the pulse 1H on the second gate line G2, the control thin-film transistor TC is turned on, and consequently the control capacitor Cd is connected to the subpixel electrode 272. Also, the voltage of the first storage line MS or 223 is changed in the time $T_1$ of that pulse. Consequently, the voltage on the main pixel electrode 271 becomes V1+Vs, and the voltage on the subpixel electrode 272 becomes V1−Vd.

The value of Vs is smaller than the voltage change value $V_{shift}$ of the first storage line 223 or MS. Denoting the electrostatic capacity of the main storage capacitor Cmst as Cmst and the electrostatic capacity of the main liquid-crystal capacitor Cmlc as Cmlc, Vs=$V_{shift}$Cmst/(Cmst+Cmlc). Denoting the electrostatic capacity of the control capacitor Cd as Cd, the electrostatic capacity of the subpixel liquid-crystal capacitor Cslc as Cslc, the electrostatic capacity of the second storage capacitor Csst as Csst, and noting that the initial voltage Vcc=A of the control electrode 255a is 0 V before the pulse 1H on the second gate line G2, we see from equation (1) that Vd=(V1)Cd/(Cslc+Csst+Cd).

Figure 11:
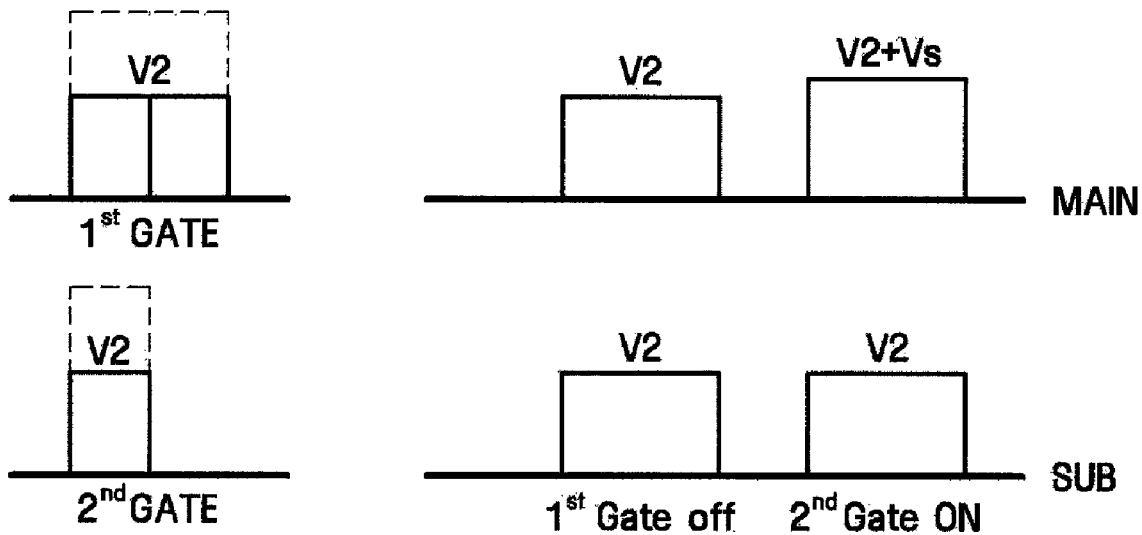
FIG. 11 illustrates voltages applied to a pixel electrode in an embodiment of FIG. 9 for the control voltage A equal to a data voltage B.

FIG. 11 is a schematic diagram illustrating the voltages at the same nodes and in the same periods as in FIG. 10 for the case when the control voltage A=B. This voltage is shown as V2 in FIG. 10.

In the pulse 1H on the first gate line G1, the first and second thin-film transistors T1 and T2 and the control thin-film transistor TC are turned on during the first period of time $T_1$. Accordingly, the control voltage A=V2 is applied to the main pixel electrode 271, the subpixel electrode 272 and the control electrode 255a connected to the subpixel electrode 272.

During the period $T_2$, only the first and second thin-film transistors T1 and T2 are turned on, and thus the pixel voltage V2 is applied to the main pixel electrode 271 and the subpixel electrode 272. Next, in the pulse 1H on the second gate line G2, the control thin-film transistor TC is turned on, and consequently the control capacitor Cd is connected to the subpixel electrode 272. Also, the voltage of the first storage line MS or 223 is changed in the time $T_1$ of that pulse. Consequently, the voltage of the main pixel electrode 271 becomes V1+Vs, and the subpixel electrode 272 remains at the voltage V2.

A value of Vs is smaller than the voltage change value $V_{shift}$ of the first storage line 223 or MS. $Vs=V_{shift}Cmst/(Cmst+Cmlc)$. Noting that the initial voltage of the control electrode 255a is Vcc=V2 before the pulse 1H on the second gate line G2, we see from equation (1) that the voltage change Vd of the subpixel electrode 272 is 0 V.

As described above, in a display device and a method of driving the same according to the present invention, different grayscale voltages can be efficiently applied to a main pixel electrode and a subpixel electrode.

While the present disclosure of invention has been particularly provided with reference to exemplary embodiments, it will be understood by those of ordinary skill in the art and in light of the foregoing that various changes in form and detail may be made therein without departing from the spirit and scope of the present teachings. The exemplary embodiments should be considered in a descriptive sense only and not for purposes of limitation.

What is claimed is:

1. A method of driving a display device to form an image to be displayed by the device, the method comprising:
    during sequential activation of gate lines of the device, which gate lines are sequentially activated to thereby form the image, providing a pixel voltage on each of first and second pixel electrodes of a pixel of the device;
    after the pixel voltage has been provided to the first and second pixel electrodes, and still during formation of the image by way of sequentially activating the gate lines, performing operations of:
    (1) electrically connecting a control capacitor to the second pixel electrode; and
    (2) changing the voltage of the first pixel electrode by changing a voltage of a first storage line which overlaps the first pixel electrode, wherein operation (2) is initiated before operation (1) finishes.

2. The method of claim 1, operation (1) reduces a voltage difference between the pixel voltage of the second pixel electrode and a common voltage.

3. The method of claim 2, operation (2) increases a voltage difference between the pixel voltage of the first pixel electrode and the common voltage.

4. The method of claim 1, wherein in operation (1), the second pixel electrode and the control capacitor are connected to each other when a switching device connected between the second pixel electrode and the control capacitor is turned on.

5. A method of driving a display device to form an image to be displayed by the device, where the device comprises a plurality of gate lines and a pixel electrode comprising a first pixel electrode and a second pixel electrode, the method comprising:
    (1) during sequential activation of the gate lines of the device, which gate lines are sequentially activated to thereby form the image, electrically connecting a control capacitor to the second pixel electrode and providing a control voltage to the first and second pixel electrodes and to a control electrode of the control capacitor;
    (2) applying a pixel voltage to each of the first and second pixel electrodes during said formation of the image by way of sequentially activating the gate lines;
    (3) electrically re-connecting the control capacitor to the second pixel electrode during said formation of the image to thereby control the voltage of the second pixel electrode by the control voltage; and
    (4) changing the voltage of the first pixel electrode during said formation of the image by changing a voltage of a first storage line which overlaps the first pixel electrode, wherein operation (4) is initiated before operation (3) finishes.

6. The method of claim 5, wherein in operation (3), a voltage difference between the voltage of the second pixel electrode and a common voltage is reduced.

7. The method of claim 6, wherein in operation (4), a voltage difference between the voltage of the first pixel electrode and the common voltage is increased.

8. The method of claim 5, wherein in operation (3), the second pixel electrode and the control capacitor are connected to each other when a switching device connected between the second pixel electrode and the control capacitor is turned on.

9. The method of claim 5, wherein the control voltage is different from the pixel voltage.

10. The method of claim 9, wherein the common voltage is closer to the control voltage than to the pixel voltage.

11. The method of claim 5, wherein the control voltage is equal to the pixel voltage.

12. The method of claim 5, wherein the control voltage is equal to the pixel voltage.

13. The method of claim 5, wherein operation (1) finishes before operation (2) finishes.

14. A method of driving a display device to form an image to be displayed by the device, the method comprising:
    during sequential activation of gate lines of the device, which gate lines are sequentially activated to thereby form the image, providing a pixel voltage to each of first and second pixel electrodes of a pixel of the device; and
    then during said formation of the image, changing the voltages applied to the first pixel electrode and/or the second pixel electrode to cause the first and second pixel electrodes to simultaneously be at different voltages for forming the image,
    wherein the first pixel electrode overlaps a first storage line to form a first storage capacitor, the second pixel electrode overlaps a second storage line to form a second storage capacitor, and a voltage of the first storage line is different from a voltage of the second storage line.

15. A method of driving a display device to form an image to be displayed by the device, the method comprising:
    during sequential activation of gate lines of the device, which gate lines are sequentially activated to thereby form the image, providing a pixel voltage on each of first and second pixel electrodes of a pixel of the device;
    after the pixel voltage has been provided to the first and second pixel electrodes, and still during formation of the image by way of sequentially activating the gate lines, performing operations of:
    (1) electrically connecting a control capacitor to the second pixel electrode; and
    (2) changing the voltage of the first pixel electrode by changing a voltage of a first storage line which overlaps the first pixel electrode, wherein the control capacitor is formed between a control electrode electrically connected to the second pixel electrode through a control switching device electrically connected to the second pixel electrode and a second storage line, a voltage of the first storage line is different from a voltage of the second storage line.

16. A method of driving a display device to form an image to be displayed by the device, where the device comprises a plurality of gate lines and a pixel electrode comprising a first pixel electrode and a second pixel electrode, the method comprising:

(1) during sequential activation of the gate lines of the device, which gate lines are sequentially activated to thereby form the image, electrically connecting a control capacitor to the second pixel electrode and providing a control voltage to the first and second pixel electrodes and to a control electrode of the control capacitor;

(2) applying a pixel voltage to each of the first and second pixel electrodes during said formation of the image by way of sequentially activating the gate lines;

(3) electrically re-connecting the control capacitor to the second pixel electrode during said formation of the image to thereby control the voltage of the second pixel electrode by the control voltage; and (4) changing the voltage of the first pixel electrode during said formation of the image by changing a voltage of a first storage line which overlaps the first pixel electrode, wherein the control capacitor is formed between a control electrode, which is electrically connected to the second pixel electrode through a control switching device electrically connected to the second pixel electrode, and a second storage line which overlaps, a voltage of the first storage line is different from a voltage of the second storage line.

* * * * *